United States Patent
Nicholas et al.

(10) Patent No.: US 6,602,605 B2
(45) Date of Patent: Aug. 5, 2003

(54) MODIFIED WOOD WITH SURFACE COATINGS

(75) Inventors: Darrel D. Nicholas, Starkville, MS (US); Eugene Michael Ivankoe, Chatham, NJ (US); Moon G. Kim, Starkville, MS (US); Charles U. Pittman, Starkville, MS (US); Lichang Wang, Starkville, MS (US); Ahmed Kabir, Saltillo, MS (US); Tor P. Schultz, Starkville, MS (US); Leonard L. Ingram, Starkville, MS (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/051,627

(22) Filed: Jan. 17, 2002

(65) Prior Publication Data

US 2002/0176995 A1 Nov. 28, 2002

Related U.S. Application Data

(63) Continuation of application No. 08/986,023, filed on Dec. 5, 1997, now abandoned.

(51) Int. Cl.$^7$ ............................ B32B 27/40; B32B 21/08
(52) U.S. Cl. .................................. 428/423.3; 428/425.1
(58) Field of Search ................................. 427/381, 382, 427/393, 396, 397, 408; 428/425.1, 423.3

(56) References Cited

U.S. PATENT DOCUMENTS

| 5,124,210 A | * | 6/1992 | Fong | ........................ 428/425.1 |
| 5,464,680 A | * | 11/1995 | Hauser et al. | ............... 428/141 |
| 5,584,958 A | * | 12/1996 | Gillis et al. | ............... 156/331.4 |

* cited by examiner

Primary Examiner—D. S. Nakarani
(74) Attorney, Agent, or Firm—Robert C. Beam

(57) ABSTRACT

A method and process for treating wood. The steps include preparing isocyanate-based reactive prepolymer resins for impregnation, impregnating wood with these impregnation resins, curing the impregnated wood at elevated temperatures, preparing isocyanate resin-based coating materials and applying these coating materials on the cured impregnated wood and curing the coatings at room or elevated temperatures. The resulting treated wood has substantially improved de-contaminability of the chemical warfare agent VX both initially and after long exposure to degradation effects from sunlight.

10 Claims, No Drawings

MODIFIED WOOD WITH SURFACE COATINGS

This application is a continuation of application Ser. No. 08/986,023, filed on Dec. 5, 1997 now abandoned, by Darrel D. Nicholas, Michael Ivankoe, Moon G. Kim, Charles U. Pittman, Lichang Wang, Ahmed Kabir, Tor P. Schultz and Leonard L. Ingram, entitled MODIFIED WOOD WITH SURFACE COATINGS.

The invention described herein may be made, used, or licensed by or for the Government for Governmental purposes without the payment to me of any royalties thereon or therefore.

FIELD OF INVENTION

The present invention relates to impregnated, surface coated wood products. More particularly, the present invention relates to the use of isocyanate-based polymers that are highly lightfast and de-contaminatable to impregnate and surface coat solid wood products with tight film formation via polymer grafting on wood cell surfaces when the prepolymers cure.

BACKGROUND OF THE INVENTION

An important goal in wood research has been to improve performance properties of wood for use in harsh environments and demanding conditions comparable to those which steel is exposed to for use for various reasons. One specific case of interest is the decontaminability of various chemical warfare agents that use a strong alkaline solution. The decontamination performance quality, especially that of the chemical warfare agent VX due to its unique affinity to many surfaces, has been considered to be highly necessary in military uses of wood for pallets and other packaging components. Use of raw or surface-coated wood has been severely limited in this application because of the inherently de-contaminability arising from the porosity of wood, inadequate performance of available surface coatings materials, and environmental degradation, especially from sunlight, of wood and surface coating materials in general.

As of now, surface coatings materials for wood that can meet the relevant U.S. Military requirements are not available. The coatings approach has also been considered to be of limited utility because of the likelihood of abrasion in use, suggesting that wood properties through the entire wood thickness need to be improved. Accordingly, materials and method for impregnating and coating wood to attain lightfast and de-contaminatable properties have been a highly desirable development objective in military logistics. Convention wood impregnation prepolymers such as phenon-formaldehyde or melamine-formaldehyde were shown to have effects of decreasing the wood strength due to the brittle nature of the polymer structures. These prepolymers were unacceptable in addition due the unknown de-contaminability of the warfare agent VX on wood with these polymers impregnated therein.

One object of the present invention is therefore to provide wood impregnation and coatings materials for enhancing various wood properties including the decontaminability of the chemical warfare agent VX before and after a long exposure to the degradation effect of sunlight.

Another object of the present invention is to provide impregnation and coating procedures for manufacturing the treated wood products using the impregnation and coatings materials of this invention.

Still another object of the present invention is to provide various impregnated and coated wood materials that have various enhanced properties including the de-contaminability of the chemical warfare agent VX before and after long exposure to the degradation effect of sunlight.

Other Objects will appear hereinafter.

SUMMARY OF THE INVENTION

It has now been discovered that the above and other objects of the present invention may be accomplished in the following manner. Specifically, the invention comprises a method and process for treating wood.

The steps of the method include preparing isocyanate-based reactive prepolymer resins for impregnation, impregnating wood with these impregnation resins, curing the impregnated wood at elevated temperatures, preparing isocyanate resin-based coating materials and applying these coating materials on the cured impregnated wood and curing the coatings at room or elevated temperatures. The final product is novel and useful in a variety of applications including those applications described herein.

DETAILED DESCRIPTION OF THE PREFERRED EMBODIMENT

As noted above the present invention involves a series of steps to accomplish the objects of the invention. The first step comprises the preparation of isocyanate-based reactive prepolymer resins for wood impregnation. This may be accomplished using various commercially available isocyanate materials such as toluene diisocyanates (TDI), methylene-bisphenylene diisocyanates (MDI), and low molecular weight derivatives of MDI or other aliphatic isocyanates. All are suitable for the present invention.

Preferred are those materials that have a functionality close to 2.0. Higher functionality isocyanates can be used, but they are less suitable for synthesis of the impregnation prepolymers of this invention.

Polyols suitable for reaction with these isocyanates are linear polyols having a molecular weight range from about 500 to about 5000 daltons and a hydroxyl group functionality of about 2.0. Also polyols having a major amount of hydrophobic segments, such as propylene oxide or butadiene groups, are preferred over those of the more hydrophilic groups, such as ethylene oxide groups. Polyols suitable for this invention are linear polyols, such as, for example, ethylene oxide-propylene oxide copolymers, polytetrahydrofurans, and hydroxyl group-terminated polybutadienes.

For the synthesis of the prepolymer of this invention, the isocyanate/polyol ratio should be in a range that will keep the amount of isocyanate (NCO) functional groups, left unreacted at the end of the synthesis reaction, at a level between about 3% and 20% by weight based on the total weight of the isocyanate and and polyol materials used in the reaction. This excess isocyanate functionality is designed for later reactions with hydroxyl groups and moisture in the wood during the curing process, so that a tightly coupled wood-polymer composite material is obtained. Too high levels of isocyanate group are not desirable because of the slow curing rate in the wood and also because of the rough cured surfaces caused by excessive curing with the moisture in the air.

The prepolymer resin synthesis reaction must be conducted in the absence of moisture, preferably under a stream of dry nitrogen, and at an elevated temperature until all hydroxyl groups of the polyol are reacted. This completeness of reaction is determined when no further increase in viscosity is occurring. The reaction mixture is then cooled to room temperature and may at that time be diluted with a suitable water-dry solvent such as methyl ethyl keytone or Cellosolve Acetate, or the like. The mixture should be stored in a dry, closed container.

The second step comprises the impregnation of wood with the prepolymer resins, followed by curing them. The wood should first be dried to a moisture content ranging from about 2% to 14%, based on the oven dry wood weight and the free isocyanate group content of the prepolymer resin should be adjusted to approximate the wood moisture content level. Any wood impregnation procedure may be used as long as the impregnation is sufficiently complete. One such process is generally described as a "full cell" process, used here to illustrate the process using the prepolymers of the present invention.

A wood sample is placed on a plan in a cylinder and a vacuum is applied to the cylinder, up to about 28 inches of vacuum. A prepolymer is introduced to the pan through an opening to completely cover the wood sample. The vacuum is then continued for about 30 minutes and, after release of the vacuum, a positive pressure of about 150 psi is applied for about 60 minutes. After the pressure is released, the wood sample is taken out, wiped and dried in a ventilated hood for several hours or more. Samples can then be cured in a heated oven, at about 40° C. for 20 to 24 hours, more or less.

The third step includes preparation of surface coating materials for use in the present invention. Two package formulations based on aliphatic isocyanates and multifunctional polymeric polyols are preferred for this invention. Aliphatic isocyanates such as hexane diisocyanate and isophorone diisocyanate or their oligomeric adduct products are suitable. The isocyanate is formulated as one part of the coating system with suitable solvents for adjustment of the viscosity and other properties. The multi-functional polyol is the major component of the second part of the coating system, again with suitable solvents for adjustment of the viscosity. It is preferred that the polyol should be polymeric molecules with a molecular weight range from about 500 to about 15,000 daltons and having more than two hydroxyl groups per molecule with a background structure of either aliphatic or aromatic carbon chains.

Various additives that are normally needed for many Coating formulations may be added to this polyol part if desired. The additives particularly useful for the coating system of this invention are flow promoters such as certain acrylic copolymers, hydroxy group-crosslinking additives such as methylolated melamine-formaldehyde resins, hydrophobicizing pigment and crosslinking agents such as epoxyalkylsilanes, and graft promoters between the polymer and wood surface such as acrylic ester monomers with attendant initiators.

The hydroxyl groups of the polyol are mostly cured with the isocyanate groups by forming urethane bonds but also they are cured by forming bonds with the melamine formaldehyde and epoxysilane components. The two part coating system should be mixed well before its application in a proportion such that the number of isocyanate functionality should be somewhat higher than the number of available hydroxyl groups. This is done to assure adequate self-crosslinking by reacting with moisture in the air and for forming urea bonds. Excess isocyanate functionality as well as any deficiency of it in this final mixed coating system should be avoided.

The next step is the application of the surface coating materials followed curing it. The surface coating materials prepared as described above should be applied within an hour or two of preparation. The viscosity may be adjusted to some extend by adding a solvent such as methyl ethyl ketone or Cellosolve Acetate. Application of the coating is done using a brush, or alternatively, by spraying methods. Of course, the fumes in the application area are to be well controlled.

After the application of the coating, the coated object should be kept in a well ventilated area until all solvent evaporates and the system cures completely. Alternatively, a faster curing can be achieved by using slightly elevated temperatures such as up to about 40° C. to 60° C., in a properly ventilated oven.

EXAMPLES OF THE PREFERRED EMBODIMENT

The following examples demonstrate how the objects of the present invention are accomplished. These are presented for illustrative purposes and not as limitations on the scope of the invention. Where parts are mentioned, they are parts by weight, based on the total weight of the mixture of formulation.

EXAMPLE ONE

A material charge formula comprising 55 parts of isocyanate (Isonate 1143L, from Dow Chemical Co.) and 45 parts of polymeric polyol (Voranol 220-119, from Dow Chemical Co.) were charged in a dry reactor under dry nitrogen and reacted for two hours at 75–80° C. After cooling to room temperature, the prepolymer resin was diluted with methyl ethyl ketone to a 90% resin solids level resulting in a viscosity of about 200 cP. The free NCO group content of the prepolymer resin was calculated to be 15.0%, based on the total resin solids.

EXAMPLE TWO 41.0 parts of Isocyanate (Isonate 1143L, from Dow Chemical Co.), 13.8 parts of polymeric polyol #1 (Voranol 220-056, from Dow Chemical Co.) and 45.2 parts of polymeric polyol #2 (Poly bd R-45HT, from Atochem, Inc.) were charged in a dry reactor under dry nitrogen and reacted for two hours at 80° C. After cooling down to room temperature, the prepolymer resin was diluted with methyl ethyl keytone to a 80% resin solids level resulting in a viscosity of 275 cP. The free NCO group content of the resin was calculated to be 10.0% based on the total resin solids.

EXAMPLE THREE 57.2 parts of Isocyanate (Isonate 1143L, from Dow Chemical Co.). 11.8 parts of polymeric polyol #1 (Voranol 220-056, from Dow Chemical Co.) and 31.0 parts of polymeric polyol #2 (Poly bd R-45HT, from Atochem, Inc.) were charged in a dry reactor under dry nitrogen and reacted for two hours at 80° C. After cooling down to room temperature, the prepolymer resin was diluted with methyl ethyl keytone to a 80% resin solids level resulting in a viscosity of 125 cP. The free NCO group content of the resin was calculated to be 15.0% based on the total resin solids.

EXAMPLE FOUR

Four six inch by six inch by ½ inch pieces of southern pine dried to a 12% moisture content were placed on a pan in a cylinder. A 28 inch vacuum was applied and the prepolymer resin from Example One was introduced to fill the pan and the vacuum was continued for about 30 minutes.

After the vacuum was released, a 150 psi air pressure was applied to the cylinder for about 60 minutes. After the pressure was released, samples were taken out and the excess resin on the surface was wiped away. Samples were dried in a ventilated hood for 24 hours and then cured in a heated oven at about 40° C. for five hours. The polymer weight gain was 80% and the toughness test result performed according to ASTM C143 with a sample length of 5.5 inches showed a 39% improvement over an untreated control sample.

EXAMPLE FIVE

Four six inch by six inch by ½ inch pieces of southern pine dried to a 12% moisture content were placed on a pan in a cylinder. A 28 inch vacuum was applied and the prepolymer resin from Example Three was introduced to fill the pan and the vacuum was continued for about 30 minutes. After the vacuum was released, a 150 psi air pressure was applied to the cylinder for about 60 minutes. After the pressure was released, samples were taken out and the excess resin on the surface was wiped away. Samples were dried in a ventilated hood for 24 hours and then cured in a heated oven at about 40° C. for five hours. The polymer weight gain was 30% and the toughness test result performed according to ASTM C143 with a sample length of 5.5 inches showed a 31% improvement over an untreated control sample.

EXAMPLE SIX

Four six inch by six inch by ½ inch pieces of southern pine Dried to a 12% moisture content were placed on a pan in a Cylinder. A 28 inch vacuum was applied and the prepolymer resin from Example Three was introduced to fill the pan and the vacuum was continued for about 30 minutes. After the vacuum was released, a 150 psi air pressure was applied to the cylinder for about 60 minutes. After the pressure was released, samples were taken out and the excess resin on the surface was wiped away. Samples were dried in a ventilated hood for 24 hours and then cured in a heated oven at about 40° C. for five hours. The polymer weight gain was 86% and the toughness test result performed according to ASTM C143 with a sample length of 5.5 inches showed a 11% improvement over an untreated control sample.

EXAMPLE SEVEN

In this experiment a two-package system was prepared that consisted of Part A and Part B, of which material charges were as follows:

| PART A: | |
|---|---|
| Epoxy prepolymer, Araldite GZ488N-40 (Ciba-Geigy) | 100.00 |
| Methyl ethyl ketone (MEK) | 50.00 |
| Cellosolve Acetate | 50.00 |
| Modaflow, 10% in MEK, (Monsanto Chemical Co.) | 1.00 |
| Melamine-formaldehyde Prepolymer, Cymel 303 (American Cyanamid Corp.) | 12.00 |
| Epoxyalkylsilane, Monomer Silane A-18 (Union Carbide Corp.) | 1.00 |
| TMPTMA, Sartomer 350 (Sartomer Co.) | 0.01 |
| Silver perchlorate, 0.1% solution in MEK | 0.0001 |
| Part A Total | 214.0101 |
| PART B: | |
| Urethane prepolymer, Desmodur N-75 (Mobay Chemical Corp.) | 25.00 |
| Xylene | 20.00 |
| Cellosolve acetate | 20.50 |
| Part B Total | 65.50 |

Part A and Part B were made, separately, by mixing the materials in the given order in a dry reactor. The final coating composition was obtained by mixing 33 parts of Part A and 10 parts of Part B to a uniform mix in a blender.

EXAMPLE EIGHT

A six inch by ½ inch piece of southern pine was coated with Example Seven material using a soft-bristled brush to give a dried film thickness of four to five mil. The coating was dried in a ventilated hood for 24 hours and cured at 40° C. for 24 hours, resulting in a uniform clear glossy coating.

EXAMPLE NINE

Part A of Example Seven was tinted with a solvent-borne white tinting base and a green pigment base by mixing in, respectively, 1.5 parts and 1.0 parts to 98.5 parts of Example Seven, Part A. Mixing this tinted material and Example Seven, Part B, in a ration of 33 parts to 10 parts resulted in a pigmented coating formulation. Coating a piece of southern pine and solvent cleaned mild steel with this coating formula to a three to five mil dry film thickness resulted in a green coating with a good hiding and film adhesion properties.

EXAMPLE TEN

A phenol-formaldehyde resol resin was prepared by reacting 64.2 parts of 90% phenal and 35.2 parts of 50% formaldehyde in the presence of 1.1 parts sodium hydroxide at 75° C. for eight hours. The resulting resin showed a viscosity of 50 cP and a solids content of 60.0%. The resin was impregnated into southern pine wood in the exact way as in Example Three and the sample was cured in a hot press at 194° C. for 10 minutes under a platen pressure of 50 psi. The polymer weight gain was 46.0% and the sample surface showed a shiny coating with the cured PF polymer resin and the toughness test result obtained according to the ASTM C143 using a sample length of 5.5 inches showed a decrease to a 58% of the untreated control sample.

EXAMPLE ELEVEN

A six inch by ½ inch piece of southern pine was coated using a soft-bristled brush with a two-package epoxy resin system, Devcon 2-ton Epoxy, obtained from Devcon Corporation of Wood Dale, Ill. This coating produced a dried film thickness of four to five mils. The coated sample was dried in a ventilated hood for 24 hours and cured at 40° C. for 24 hours resulted in a uniform clear glossy coating.

EXAMPLE TWELVE

A melamine-formaldehyde resin, Product #PC-6N, was obtained from Astro Industries. Its formaldehyde/melamine mole ratio was reported to be five to six, solids content was 80.0% and its pH value was 8.8. The resin was catalyzed with a 0.3% ammonium chloride in the laboratory and impregnated into southern pine wood in the exactly same way as described in Example Three and cured in an oven for four hours with a temperature schedule of gradually increasing from 40° C. to 150° C. during the curing period. The polymer weight gain was 25% and the toughness test result, obtained according to ASTM D 143 using a sample length of 5.5 inches, showed an improvement of 6% over an untreated control sample.

EXAMPLE THIRTEEN

Impregnated wood samples obtained using the procedures and materials of Example Five were coated with the coating formula of Example Seven using the procedure of Example Eight. Pine, aspen, and oak were used in this experiment.

EXAMPLE FOURTEEN

Selected impregnated and/or coated wood samples obtained in the above Examples were tested for de-contaminated efficiency of the chemical warfare agent VX according to the U.S. Military standard XXX by the Midwest Research Institute, Kansas City, Kans. For the pine sample of Example Thirteen and a steel control sample, de-contamination efficiency was tested also after subjecting them to the simulated sunlight weathering procedure according to ASTM G-26, MIL STD 810 E. Procedure II. The following results were obtained:

| EXAMPLE NO. WEATHERING | | AS IS | AFTER |
|---|---|---|---|
| EXAMPLE 4 | | | 10 |
| EXAMPLE 5 | | | 4.8 |
| EXAMPLE 6 | | | 14 |
| EXAMPLE 8 | | | 0 |
| EXAMPLE 10 | | 200 | |
| EXAMPLE 11 | | 58 | |
| EXAMPLE 12 | | 58 | |
| EXAMPLE 13 | Pine | 1.33 | 0.56 |
| | Aspen | 1.07 | |
| | Oak | 7.37 | |
| Mild Steel (control) | | 0 | 112 |

The results show the superiority of the impregnation and coatings formulations of this invention over conventional systems in de-contamination ability before and after a long sunlight degradation procedure. Also, wood strength properties were shown to be improved over the untreated wood by the impregnation materials and methods of this invention.

From the data and examples above, it is obvious that the impregnation and coatings formulations and procedures of this invention afford many desirable results and excellent performance for wood in various applications over conventional systems.

Obviously many variations and ramifications can be made in the products and processes of this invention set forth above without departing from the spirit and scope of this invention. While particular embodiments of the present invention have been illustrated and described herein, it is not intended that these illustrations and descriptions limit the invention. Changes and modifications may be made herein without departing from the scope and spirit of the following claims.

What is claimed is:

1. A modified wood of improved toughness and decontaminability to chemical agent VX by washing with strong alkali, said modified wood being prepared by a process comprising the steps of:
   (a) drying wood to a moisture content of from about two percent (2%) to about fourteen percent (14%) on a dry weight basis;
   (b) impregnating the wood with an impregnation resin to form an impregnated wood, said impregnating including the steps of:
      (i) preparing said impregnation resin by reacting an isocyanate-based reactive prepolymer having an isocyanate functionality of about two (2.0) with a linear polyol having a hydroxyl functionality of about two (2.0) and a molecular weight between about five hundred (500) and about five thousand (5,000) Daltons, until an impregnation resin with from about three weight percent (3.0%) to about twenty weight percent (20.0%) unreacted isocyanate groups is obtained;
      (ii) impregnating the wood of step (a) with the impregnating resin and outing the composition until the unreacted isocyanate groups of the resin react with the moisture and hydroxyl groups in the wood to form an impregnated wood with improved toughness, lighfastness, and decontaminability to chemical agent VX; and
   (c) forming a surface coating on the wood with a surface coating resin system to product a modified wood, said surface coating being formed by the steps of:
      (i) preparing a two-part surface coating resin comprising:
         (A) a first part that is a multifunctional polyol resin having more than two hydroxyl groups per molecule; and,
         (B) a second part that is an aliphatic diisocyanate;
      (ii) in a moisture-free environment, mixing the two parts together, and;
      (iii) applying the mixture of part (ii) to the surface of the impregnated wood and curing the mixture to form a surface film.

2. The modified wood of claim 1, wherein the decontaminability level for chemical agent VX is equal to or less than 14 micrograms per square centimeter (14 $\mu g/cm^2$).

3. The modified wood of claim 1, wherein the wood is selected from the group consisting of southern pine, jack pine, Douglas Fir, oak, gum, yellow poplar, maple, aspen, cotton wood, ponderosa pine, luan, and lodge pole pine.

4. The modified wood of claim 3, wherein the wood is southern pine.

5. The modified wood of claim 3, wherein the wood is oak.

6. The modified wood of claim 3, wherein the wood is aspen.

7. The modified wood of claim 1, wherein the decontaminability level for chemical agent VX is equal to or less than 14 micrograms per square centimeter (14 $\mu g/cm^2$), and the wood is selected from the group consisting of southern pine, jack pine, Douglas Fir, oak, gum, yellow poplar, maple, aspen, cotton wood, ponderosa pine, luan and lodge pole pine.

8. The modified wood of claim 7, wherein the decontaminability level for chemical agent VX is equal to or less than 14 micrograms per square centimeter (14 $\mu g/cm^2$), and the wood is southern pine.

9. The modified wood of claim 7, wherein the decontaminability level for chemical agent VX is equal to or less than 14 micrograms per square centimeter (14 $\mu g/cm^2$), and the wood is oak.

10. The modified wood of claim 7, wherein the decontaminability level for chemical agent VX is equal to or less than 14 micrograms per square centimeter (14 $\mu g/cm^2$), and the wood is aspen.

* * * * *